(12) United States Patent
Imai

(10) Patent No.: US 6,926,219 B2
(45) Date of Patent: Aug. 9, 2005

(54) RECORDING TAPE CARTRIDGE

(75) Inventor: Fumihito Imai, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 10 days.

(21) Appl. No.: 10/329,331

(22) Filed: Dec. 27, 2002

(65) Prior Publication Data

US 2003/0122016 A1 Jul. 3, 2003

(30) Foreign Application Priority Data

Dec. 28, 2001 (JP) ........................................ 2001-399522

(51) Int. Cl.[7] .............................................. G11B 15/66
(52) U.S. Cl. ...................... 242/332.4; 242/348; 360/132
(58) Field of Search ............................... 242/332.4, 348, 242/348.1, 348.2, 348.3; 360/132

(56) References Cited

U.S. PATENT DOCUMENTS

| 6,003,802 A | * | 12/1999 | Eaton et al. | ............. 242/332.4 |
| 6,236,539 B1 | * | 5/2001 | Morita et al. | ............... 360/132 |
| 6,331,922 B2 | | 12/2001 | Morita et al. | |
| 6,388,838 B1 | * | 5/2002 | Kaneda et al. | ............... 360/132 |
| 6,499,684 B2 | * | 12/2002 | Eaton et al. | ............. 242/332.4 |
| 6,644,580 B2 | * | 11/2003 | Sasaki et al. | ............. 242/332.4 |
| 2001/0013560 A1 | * | 8/2001 | Eaton et al. | ............. 242/348.2 |
| 2002/0100831 A1 | * | 8/2002 | Sasaki et al. | ............. 242/332.4 |

FOREIGN PATENT DOCUMENTS

JP 11-250619 9/1999

* cited by examiner

Primary Examiner—William A. Rivera
(74) Attorney, Agent, or Firm—Sughrue Mion, PLLC

(57) ABSTRACT

The present invention relates to a leader member attached to a recording tape to be contained in a recording tape cartridge. A pin is provided at each end of the leader member, and the pins are resiliently projectable by springs. The springs each absorb a load generated when the leader member is attached to or detached from a cartridge case. A receiving portion is provided independently from a connecting portion which connect to the leader member. In order to eliminate changes to a length of the connecting portion due to compression of the spring and to allow smooth connection of the leader member and the connection portion, the pin resiliently projects from the recess provided at an axial center of the receiving.

23 Claims, 9 Drawing Sheets

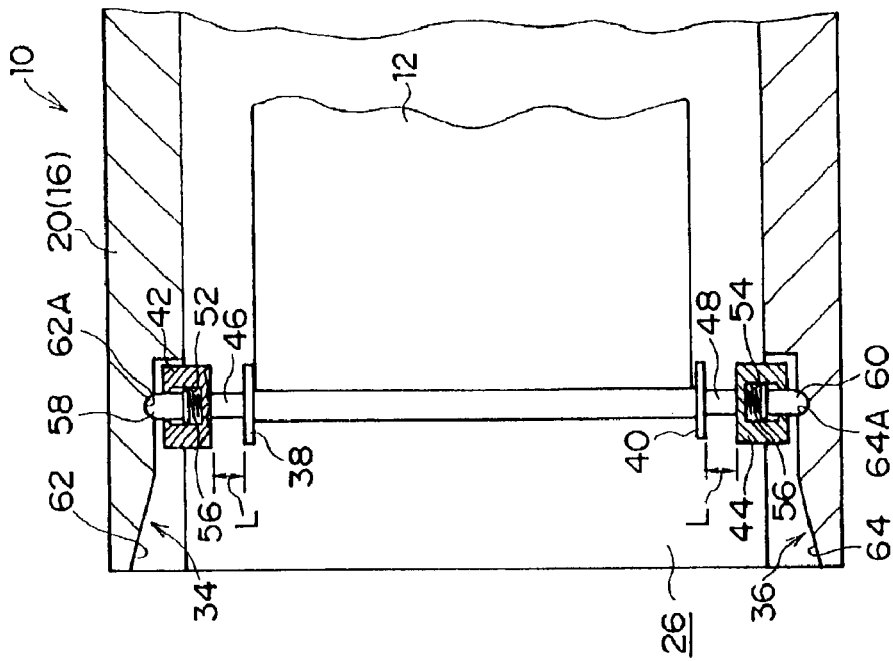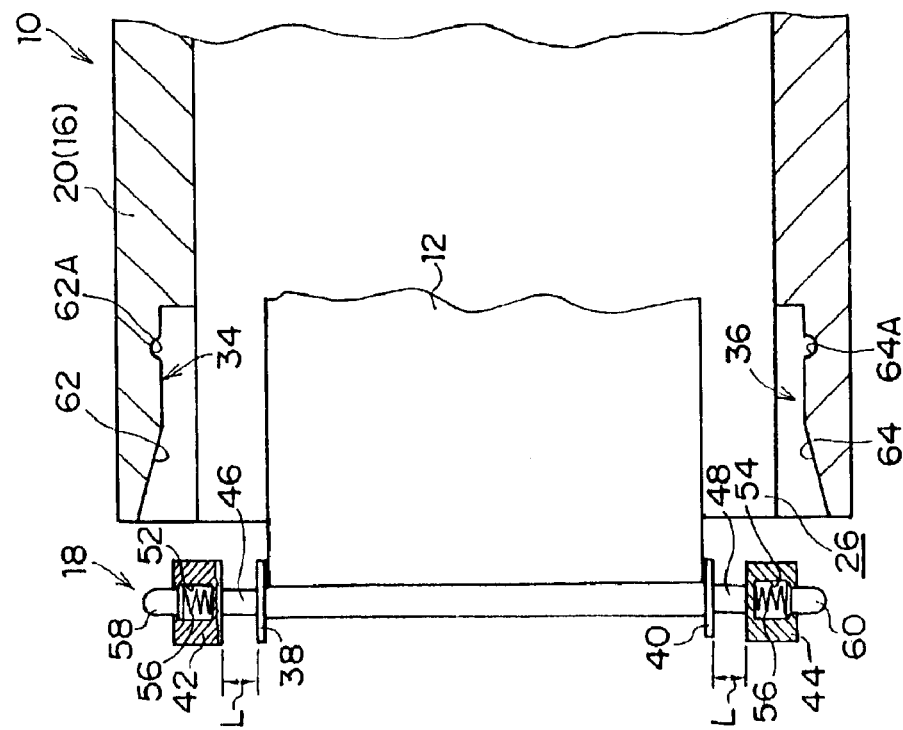

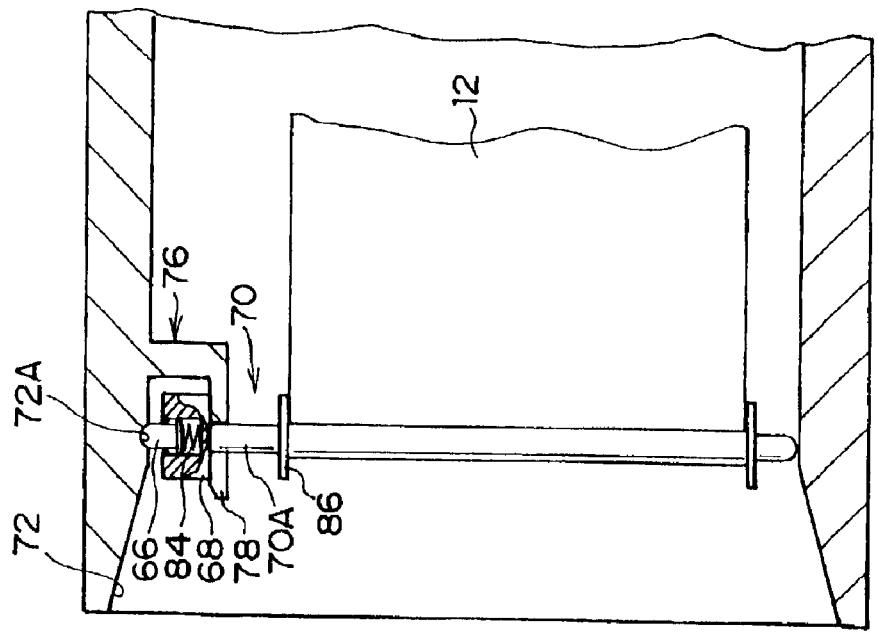
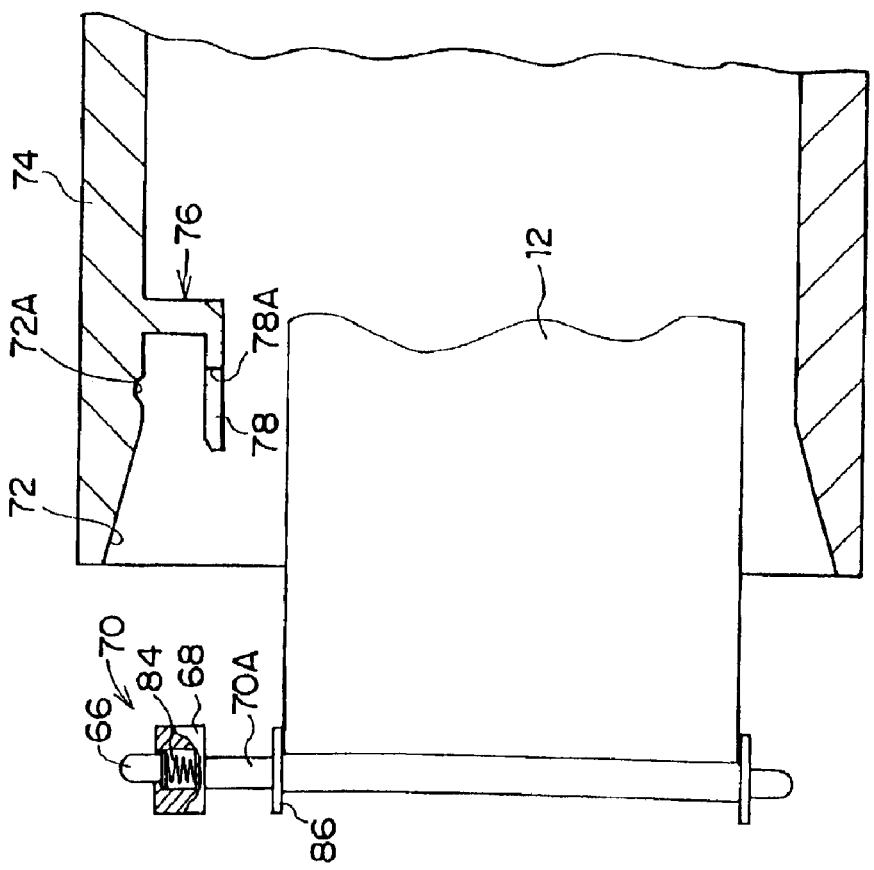

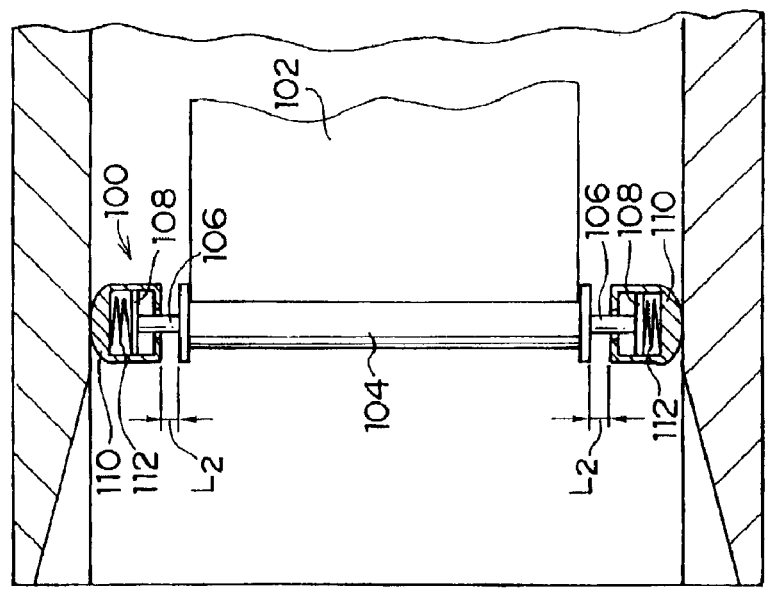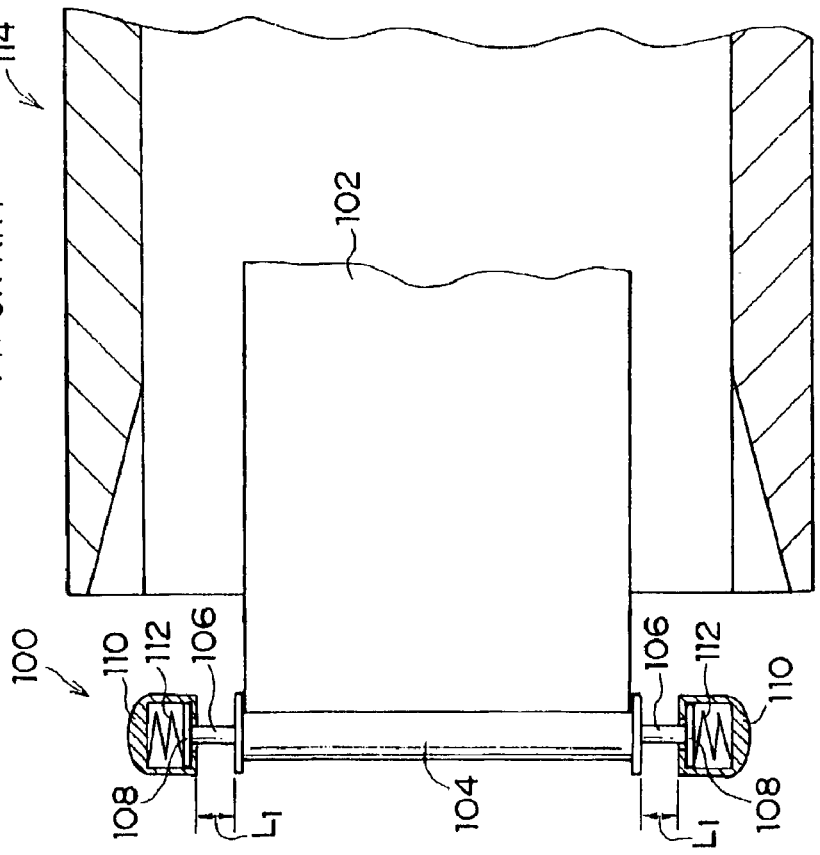

RECORDING TAPE CARTRIDGE

BACKGROUND OF THE INVENTION

1. Technical Field

The present invention relates to a tape cartridge including a case and a single reel which is contained in the case and around which a recording tape such as a magnetic tape used as a record reproducing medium for a computer, is wound.

2. Description of the Related Art

A magnetic tape cartridge is known that includes a single reel which is contained in a case and around which a magnetic tape used as a data record reproducing medium for a computer is wound, is conventionally known. A leader member, such as a leader block, leader pin or leader tape, is fixed to a leading end of the magnetic tape. The leader member is drawn from the magnetic tape cartridge by a drawing device provided in a drive system. The magnetic tape fastened to the leader member is wound around a take-up reel of the drive system.

In addition, a reel gear is inscribed in an annular shape at a center of a lower surface of the reel, which is exposed through the hole formed at a lower surface of the magnetic tape cartridge. A driving gear provided on a rotating shaft of the drive system is engaged with the reel gear to rotate the reel. Data is recorded onto the magnetic tape and the recorded data is reproduced by synchronously rotating the reel of the magnetic tape cartridge and the take-up reel of the drive system.

However, because the leader member is fit into the magnetic tape cartridge to be attached to the cartridge, a load acts on the leader member whenever it is attached to or detached from the cartridge.

There is a technique for countering this problem as shown in FIGS. 9A and 9B. A leader pin 100 has a flange portion 108 at an end of a small diameter portion 106 (connecting portion) formed at each end of a tape fastening portion 104 for fastening a leading end of a magnetic tape 102. Each of the flange portions 108 is covered by a cup-shaped member 110. A spring member 112 is disposed between the cup-shaped member 110 and the flange portion 108 at each end of the leader pin 100 so that the cup-shaped members 110 can be respectively moved toward the flange portions 108 with compression of the spring members 112. When the cup-shaped members 110 are resiliently projected, the leader pin 100 is readily attached to or detached from a magnetic tape cartridge 114.

When the magnetic tape cartridge 114 is loaded to a drive system (not illustrated), the leader pin 100 is drawn by an unillustrated drawing device of the drive system. The drawing device connects to the small-diameter portions 106 of the leader pin 100.

When the spring members 112 are compressed, the cup-shaped members 110 respectively move toward the flange portions 108 and cover the circumferences of the small-diameter portions 106. As a result, the length $L_2$ of the exposed portions of the small-diameter portions 106 in an axial direction of the leader pin 100 become shorter ($L_1 > L_2$), which may make it difficult to connect the drawing device to the small diameter portions 106.

SUMMARY OF THE INVENTION

In view of the foregoing, an object of the present invention is to provide a recording tape cartridge comprising a leader member which can be readily attached to or detached from the cartridge, and which does not affect a drawing device provided in a drive system.

According to the present invention, the leader member fixed to a leading end of a recording tape has a connecting portion, which can be connected to the drawing device disposed in the drive system. The connecting portion has an end surface with a resilient member provided thereon. The resilient member is resiliently projected in an axial direction of the leader member, without covering a circumference of the connecting portion, and is fitted in a location determining portion which is formed on a case for containing the recording tape.

A load generated when the leader member is attached to or detached from the recording tape cartridge is absorbed by the resilient member, whereby the leader member can be readily attached to or detached from the recording tape cartridge without having an excessive load applied thereto.

It is possible to control the load generated when the leader member is attached to or detached from the recording tape cartridge, by integrating the leader member with the resilient member to form a single body. Thus, the control of the load is facilitated and irregularity of the load is reduced.

The resilient member is provided on an end surface of the connecting portion. Because the resilient member is resiliently projected in the axial direction of the leader member, without covering the circumference of the connecting portion, compression of the resilient member does not influence a length of the connecting portion in the axial direction of the leader member to which the drawing device of the drive system is connected. Therefore, such a problem as compression of the resilient member causing difficulty in connecting the drawing device and the connecting portion will not arise.

As a specific example of the resilient member, the connecting portion may have a recess formed at the end surface thereof. The recess may contain a spring member and a pin. The pin can move into the recess by compression of the spring member. When the pin is pressed, the spring member is compressed to allow the pin to retract into the depth of the recess. When the pin is released from the pressure, the spring member is restored and the pin is consequently projected in a direction away from the end surface of the connecting portion.

BRIEF DESCRIPTION OF THE DRAWINGS

FIG. 5A is a partial cross-sectional view of the case and the leader pin of the recording tape cartridge of the present invention, showing a state before the leader pin is attached to the case.

FIG. 5B is a partial cross-sectional view of the case and the leader pin of the recording tape cartridge of the present invention, showing a state in which the leader pin is attached to the case.

FIG. 7A is a partial cross-sectional view of the case and the leader pin of the recording tape cartridge shown in FIG. 6, showing a state before the leader pin is attached to the case.

FIG. 7B is a partial cross-section of the case and the leader pin of the recording tape cartridge shown in FIG. 6, showing a state in which the leader pin is attached to the case.

FIG. 9A is a partial cross-sectional view of the case and the leader pin of the conventional recording tape cartridge, showing the state before the leader pin is attached to the case.

FIG. 9B is a partial cross-sectional view of the case and the leader pin of the conventional recording tape cartridge, showing a state in which the leader pin is attached to the case.

DESCRIPTION OF THE PREFERRED EMBODIMENTS

As a recording tape cartridge according to an embodiment of the present invention, a magnetic tape cartridge 10 will be briefly explained with reference to FIG. 1. For convenience of explanation, a direction "A" in which the magnetic tape cartridge 10 is loaded into a drive system is regarded as a forward direction. Given that a direction "B" is regarded as a downward direction, front, rear, left, right, top and bottom sides are defined accordingly.

Figure 1:
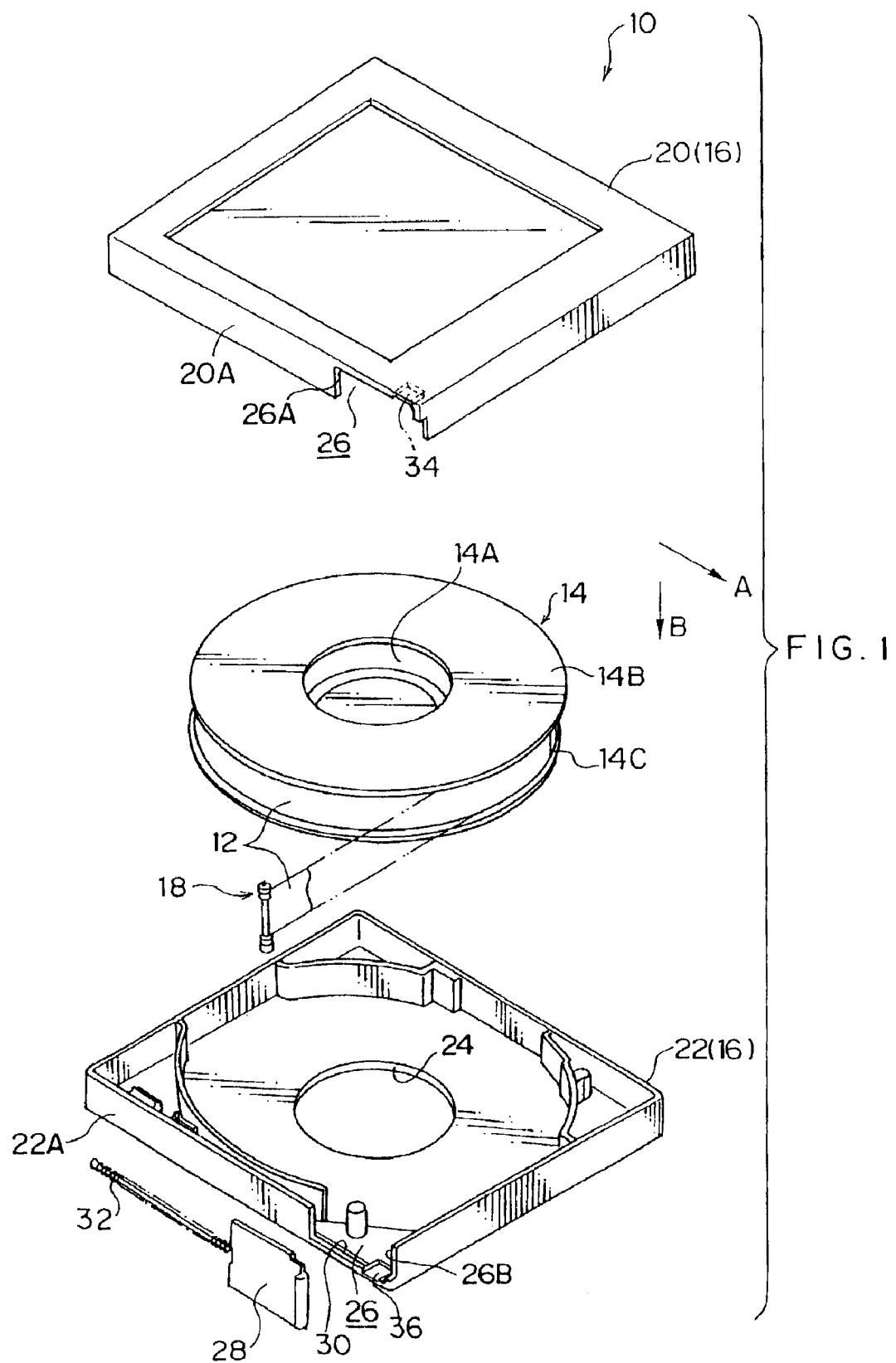
FIG. 1 is an exploded perspective view of a recording tape cartridge of the present invention.

As shown in FIG. 1, the magnetic tape cartridge 10 comprises a single reel 14 around which a magnetic tape 12 is wound as an information recording/reproducing medium. The reel 14 is rotatably contained in a case 16 having substantially a rectangular shape, when viewed from above.

The reel 14 comprises a substantially cylindrical reel hub 14A, an upper flange 14B and a lower flange 14C. The flanges 14B and 14C are coaxially fixed to the upper and lower surfaces of the reel hub 14A respectively so that they can be integrally rotated with the hub reel 14A. The magnetic tape 12 is wound on the periphery of the reel hub 14A. As a leader member, a leader pin 18 is fixed to the free end of the magnetic tape 12. Opposite ends of the leader pin 18 are projected from width-direction ends of the magnetic tape 12.

The case 16 is formed substantially in a rectangular box shape by fixing together an upper case 20 and a lower case 22. The upper case 20 and the lower case 22 are both made of a synthetic resin. A gear opening 24 is formed substantially at a center of the lower case 22 to expose an unillustrated reel gear provided at the lower part of the reel 14. An unillustrated gear engages with the reel gear to transmit a rotational force to the reel 14, thereby rotating the reel 14 in the case 16.

A right wall 20A of the upper case 20 and a right wall 22A of the lower case 22 have respectively formed therein substantially rectangular openings 26A and 26B at a right front corner of the case 16 to form an opening 26. The opening 26 is for drawing the magnetic tape 12 from the case 16. The opening 26 is opened and closed by a sliding door 28.

The upper case 20 and the lower case 22 each have one of a pair of rail grooves 30 formed along the opening 26. The rail groove of the upper case 20 is omitted from the drawings. Upper and lower ends of the sliding door 28 are inserted into the rail grooves 30. The sliding door 28 slides and moves along the rail grooves 30 to open or close the opening 26. The sliding door 28 is normally urged forward by a coil spring 32 to close the opening 26.

The upper case 20 and the lower case 22 respectively include location determining portions 34 and 36 within the opening 26. The upper and lower ends of the leader pin 18 are inserted into the location determining portions 34 and 36, whereby the leader pin 18 can be retained by the location determination portions 34 and 36.

Features of the recording tape cartridge according to the present embodiment will now be explained.

Figure 2:
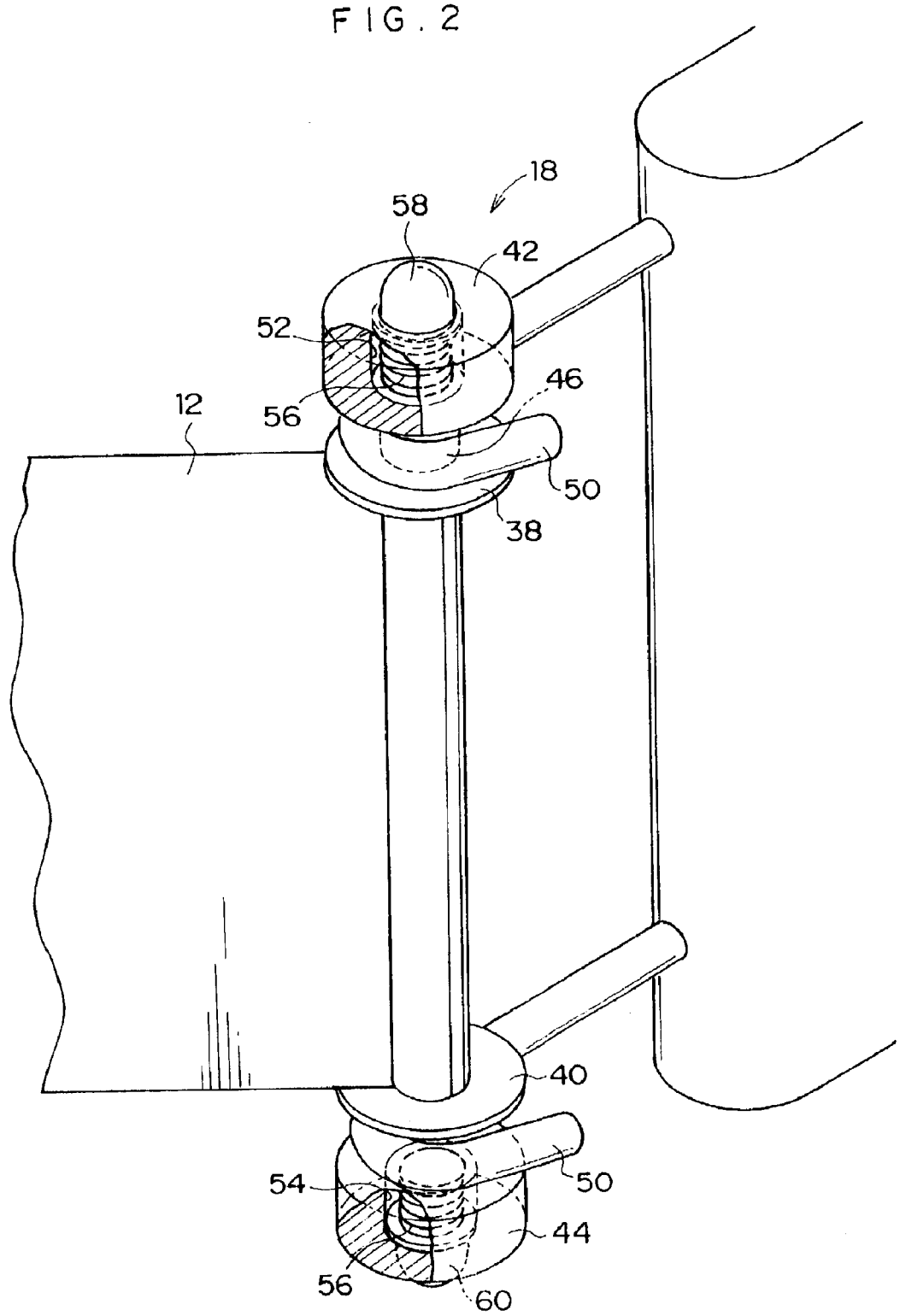
FIG. 2 is a perspective view of a leader pin of the recording tape cartridge of the present invention.

As shown in FIGS. 2 and 5A, the leader pin 18 is formed substantially in a dumbbell shape having two opposite ends of a larger diameter than a center portion. The leading end of the magnetic tape 12 is attached to the center portion of the leader pin 18 by an adhesive or the like.

The leader pin 18 also includes a pair of flanges 38 and 40, one at each of both edges (side end portions) of the magnetic tape 12. The flanges 38 and 40 control the edges of the magnetic tape 12, and ensure precise attachment of the magnetic tape 12 to the leader pin 18.

In addition, the leader pin 18 includes cylindrical receiving portions 42 and 44 at the upper and lower ends thereof respectively disposed at a predetermined distance from the flanges 38 and 40. Connecting portions 46 and 48 are formed between the receiving portion 42 and the flange 38, and between the receiving portion 44 and the flange 40. A hook 50 of the drawing device provided in the unillustrated drive system connects to each of the connection portions 46 and 48 so as to draw the leader pin 18 from the case 16.

The receiving portions 42 and 44 respectively have cylindrical recesses 52 and 54 at axes thereof to accommodate a spring 56 as a resilient member. Pins 58 and 60 each having a substantially semi-spherical leading end, can be respectively inserted into the recesses 52 and 54. The springs 56 are respectively disposed between the recess 52 and the pin 58 and between the recess 54 and the pin 60.

Figure 3:
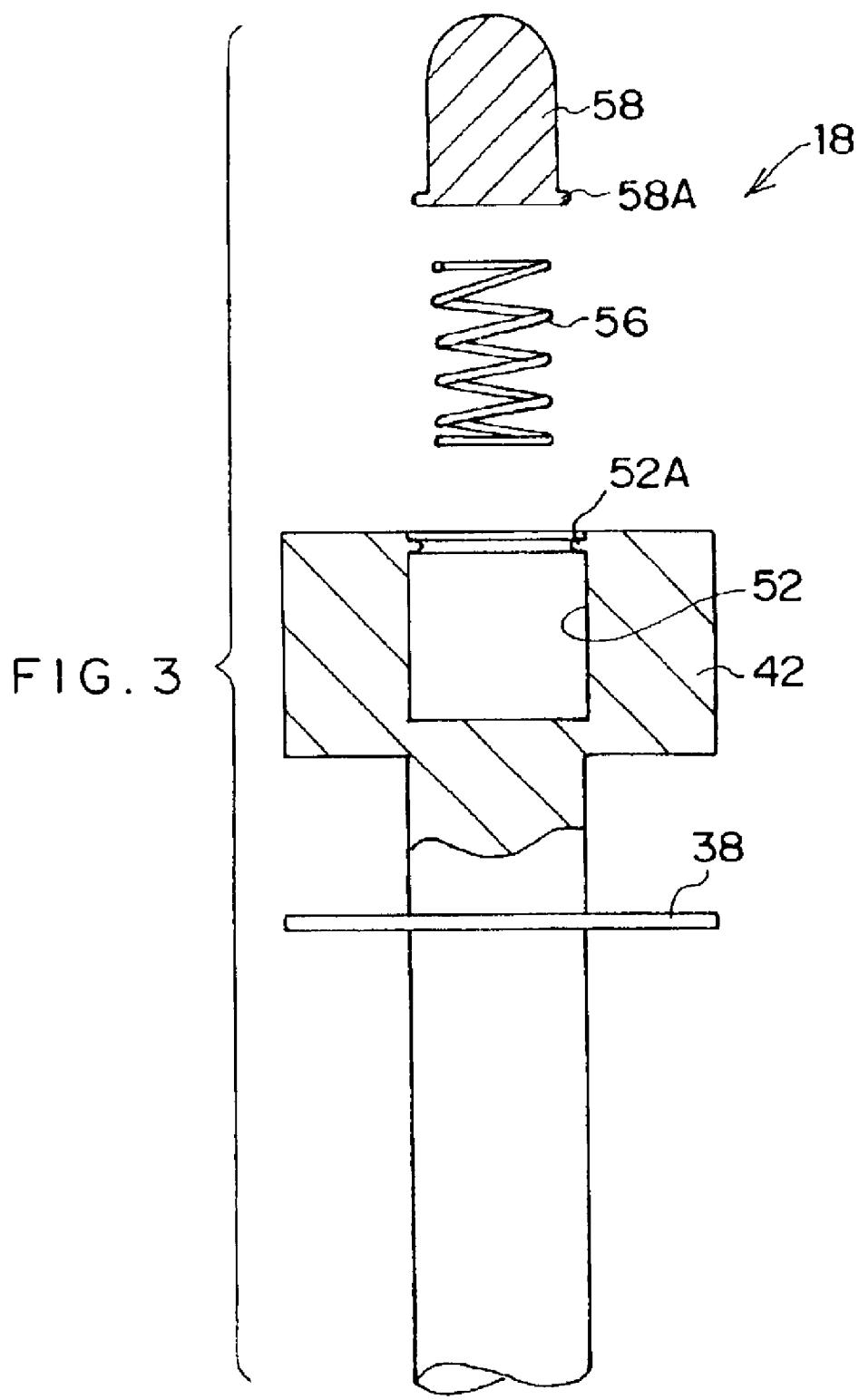
FIG. 3 is an exploded cross-sectional view showing a structure of the leader pin of the recording tape cartridge of the present invention.

As shown in FIG. 3, a projection 52A is provided protruding along an inner circumference of the recess 52. Please note that the recess 54 is identical to the recess 52 and is therefore not shown in FIG. 3. A claw portion 58A is provided protruding along the outer circumference of the pin 58 so as to be engaged with the projection 52A. The pin 60 is identical to the pin 58 and is therefore not shown in FIG. 3. When the pin 58 is inserted into the recess 52, the claw portion 58A crosses the projection 52A to prevent the pin 58 from coming completely out of the recess 52. The pin 60 has the same operation as the pin 58.

In this way, when the pin 58 is pressed, the spring 56 is compressed and the pin 58 moves toward the depth of the recess 52. When the pin 58 is released from the pressure, the spring 56 is restored so that the pin is projected from the recess 52. However, the pin 58 will never come completely out of the recess 52 because the claw portion 58A of the pin 58 engages with the projection 52A of the recess 52.

Figure 4:
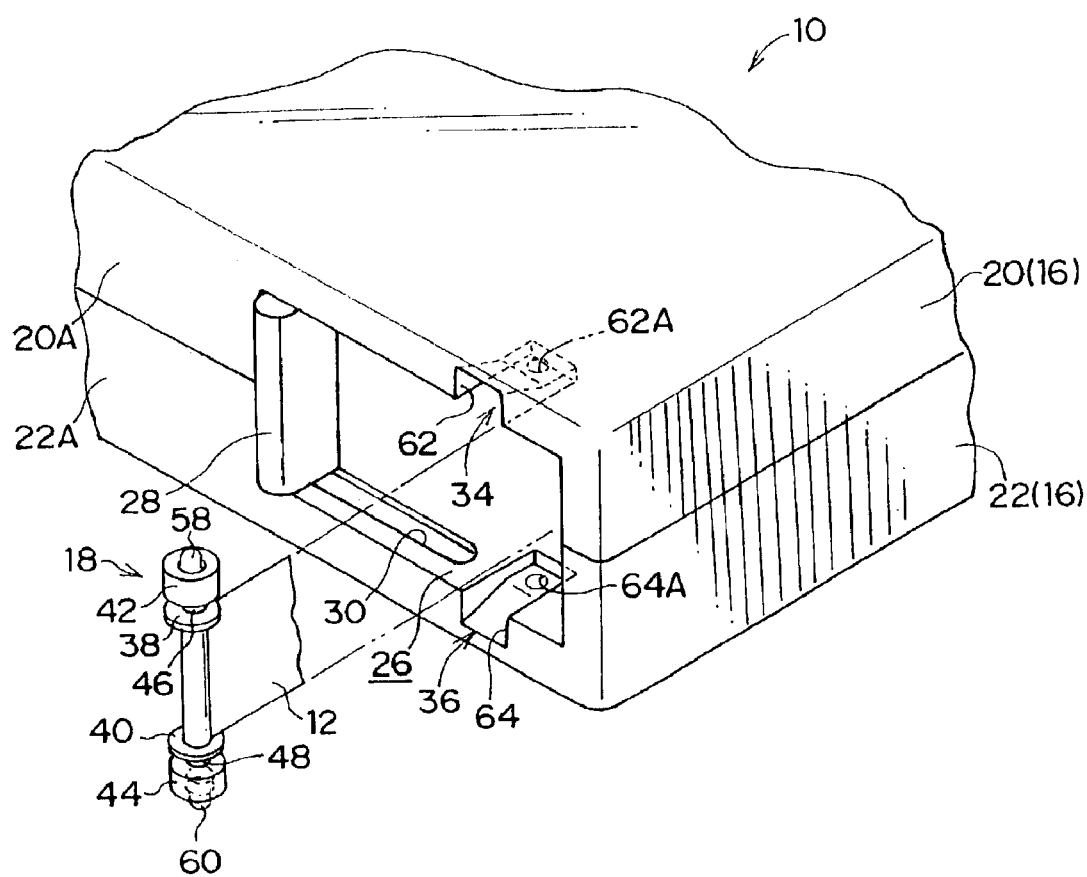
FIG. 4 is a perspective view of a case and the leader pin of the recording tape cartridge of the present invention.

As shown in FIGS. 4 and 5A, grooves 62 and 64 for guiding the leader pin 18 are respectively formed at location determining portions 34 and 36 of the upper case 20 and the lower case 22. The grooves 62 and 64 are slightly inclined to allow smooth attachment and detachment of the leader pin 18. Accordingly, a distance between the grooves 62 and 64 becomes greater as the grooves 62 and 64 respectively approach to the right walls 20A and 22A of the upper case 20 and the lower case 22.

As shown in FIGS. 5A and 5B, the further the leader pin 18 moves into the opening 26, the shorter the distance between the grooves 62 and 64 becomes. Thus, a force pressing the springs 56 via the pins 58 and 60 at the opposite ends of the leader pin 18 becomes greater to respectively seat the pins 58 and 60 within the recesses 52 and 54.

A width of the grooves 62 and 64 are substantially the same as an outer diameter of the receiving portions 42 and 44. When the leader pin 18 moves into the grooves 62 and 64, the receiving portions 42 and 44 respectively slide along the side walls of the grooves 62 and 64.

The grooves 62 and 64 have, at portions inside of the opening 26, location determining holes 62A and 64A, into which the leading ends of the pins 58 and 60 are inserted. The pins 58 and 60 move into the opening 26 along the grooves 62 and 64. When the leading ends of the pins 58 and 60 respectively reach the location determining holes 62A and 64A, the springs 56 are slightly restored, and at the same time the leading ends of the pins 58 and 60 are respectively inserted into the location determining holes 62A and 64A to hold the leader pin 18.

Operation of the present embodiment will now be explained.

As shown in FIGS. 5A and 5B, the leader pin 18 is provided with the pins 58 and 60 at the opposite ends thereof. The pins 58 and 60 are resiliently projected by the springs 56 so that a load generated when the leader pin 18 is attached to or detached from the case 16 can be absorbed by the spring 56. Accordingly, it is possible to attach the leader pin 18 to or to detach the leader pin 18 from the case 16 without applying an excessive load to the leader pin 18.

In addition, the springs 56 are provided at each end portion of the leader pin 18. Because the pins 58 and 60 at the opposite ends of the leader pin 18 are projected by the springs 56, it is possible to control the load generated when attaching the leader pin 18 to and detaching the leader pin 18 from the recording tape cartridge. Thus, the control of the load is facilitated and the irregularity in the set load is reduced.

The leader pin 18 includes the receiving portions 42 and 44 separately from the connecting portions 46 and 48. The receiving portions 42 and 44 have the recesses 52 and 54 at their axes to contain the springs 56. Also, the pins 58 and 60 are resiliently projected respectively from within the recesses 52 and 54 by the springs 56. Thus, the circumferences of the connecting portions 46 and 48 are not affected by compression of the spring 56.

Because a length L of the connecting portions 46 and 48, to which the hooks 50 (FIG. 2) connect, is not changed in any case, such a problem as compression of the springs 56 causing difficulty in connecting the hooks 50 to the connecting portions 46 and 48 will not arise.

The width of the grooves 62 and 64 are substantially the same as the outer diameter of the receiving portions 42 and 44 so that the leader pin 18 can be held with the receiving portions 42 and 44 being in contact with the side walls of the grooves 62 and 64. Thus, even if the magnetic tape cartridge 10 is dropped to the ground and impacted while not in use, the pins 58 and 60 are prevented from being dislocated from the location determining holes 62A and 64A, thereby ensuring the holding of the leader pin 18.

The leader pin 18 includes the receiving portions 42 and 44 at the opposite ends thereof, and the pins 58 and 60 are respectively projected from the end surfaces of the receiving portions 42 and 44. However, it will be apparent to those skilled in the art that the present invention is not limited to this embodiment. Various modification and alterations can be made, as long as they do not make it difficult to connect the hooks 50 of the drive system to the leader pin 18.

Figure 6:
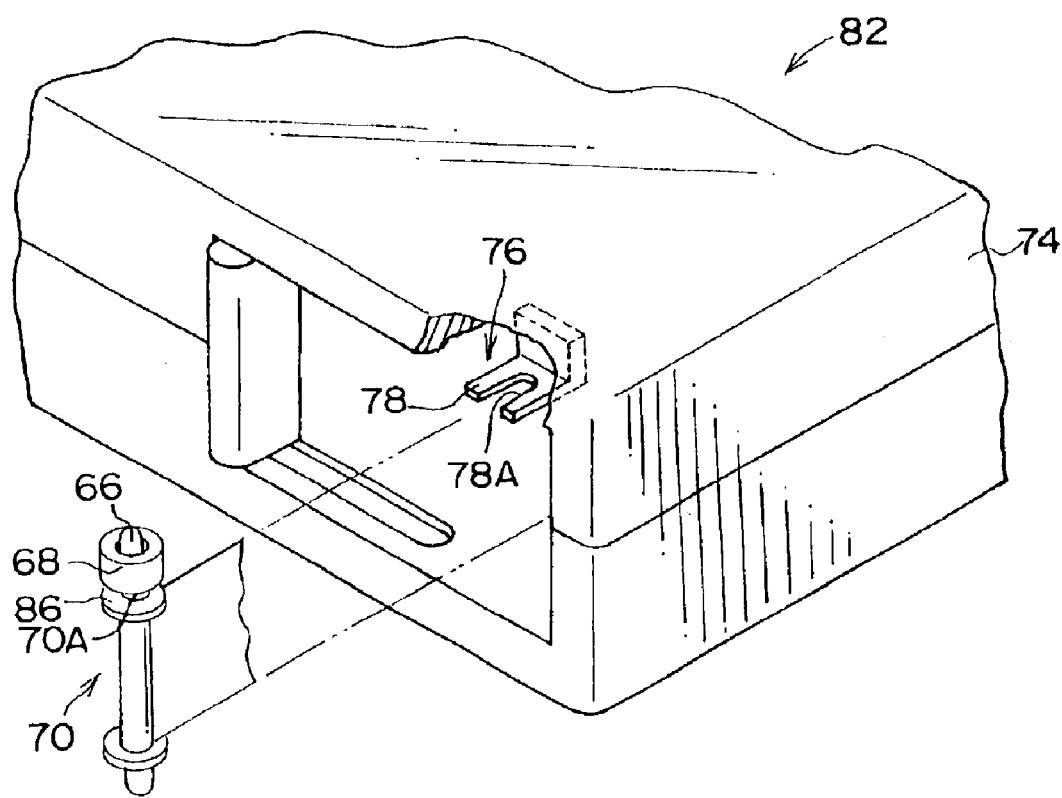
FIG. 6 is a perspective view showing another example of the case and the leader pin of the recording tape cartridge of the present invention.

For example, as shown in FIGS. 6 and 7A, a receiving portion 68, from which a pin 66 can be projected, may be formed only on an upper portion of a leader pin 70. In this case, a support member 76 having a cross section substantially in an L shape is suspended from a roof of an upper case 74. The upper part of the leader pin 70 is fitted in the support member 76.

A bent portion 78 of the support member 76 is parallel to a roof surface of the upper case 74. The bent portion 78 has a notch portion 78A substantially in a U shape, when viewed from above. The bent portion 78 is formed at a height sufficient to load the receiving portion 68 at the upper portion of the leader pin 70, when the leader pin 70 moves into a groove 72.

A width of the notch portion 78A of the bent portion 78 is substantially the same as an outer diameter of a neck portion 70A below the receiving portion 68. When the leader pin 70 moves into the groove 72, the receiving portion 68 of the leader pin 70 is loaded on the bent portion 78 of the support member 76, and the neck portion 70A of the leader pin 70 slides into the notch portion 78A.

A location determining hole 72A into which a leading end of the pin 66 can be inserted is formed at the inside of the groove 72. When the leading end of the pin 66 is inserted into the location determining hole 72A, the neck portion 70A of the leader pin 70 comes into contact with an inner wall of the notch portion 78A. Therefore, even if the magnetic tape cartridge 82 is impacted, the leading end of the pin 66 will not be dislocated from the location determining hole 72A.

In the above structure, the leader pin 70 has the pin 66 at an upper end thereof. The pin 66 is resiliently projected by the force of a spring 84 so that a load generated when the leader pin 70 is attached to or detached from the case 82A can be absorbed by the spring 84. Accordingly, it is possible to readily attach the leader pin 70 or detach the leader pin 70 from the case 85, without applying an excessive load to the leader pin 70.

The neck portion 70A of the leader pin 70 requires an area which can be fitted in the notch portion 78A of the support member 76 formed on the upper case 74, as well as an area to which the hook 50 (see FIG. 2) can be connected. Therefore, the leader pin 70 must have a longer distance between a flange 86 and the receiving portion 68 than the leader pin 18. Although only a structure in which the receiving portion 68 with the projectable pin 66 is formed on the upper part of the leader pin 70 has been explained above, it is possible to form the receiving portion with a projectable pin only at a lower portion of the leader pin.

Further, the present invention is not to be unduly limited to the embodiment shown in FIG. 3 in which the projection 52A is formed along the inner circumference of the recess 52, and the claw portion 58A is formed along the outer circumference of the pin 58 so as to be engaged with the projection 52A, thereby preventing the pin 58 from coming completely out of the recess 52. Various modifications and alterations can be made, as long as the pin 58 can move without coming completely out of the recess 52. For example, although not illustrated in the drawings, it is possible to provide a boss on the outer circumference of the pin, and an oval concave on the inner circumference of the recess in the axial direction thereof. The boss can be fitted in the oval concave to prevent the pin from coming completely out of the recess.

Figure 8:
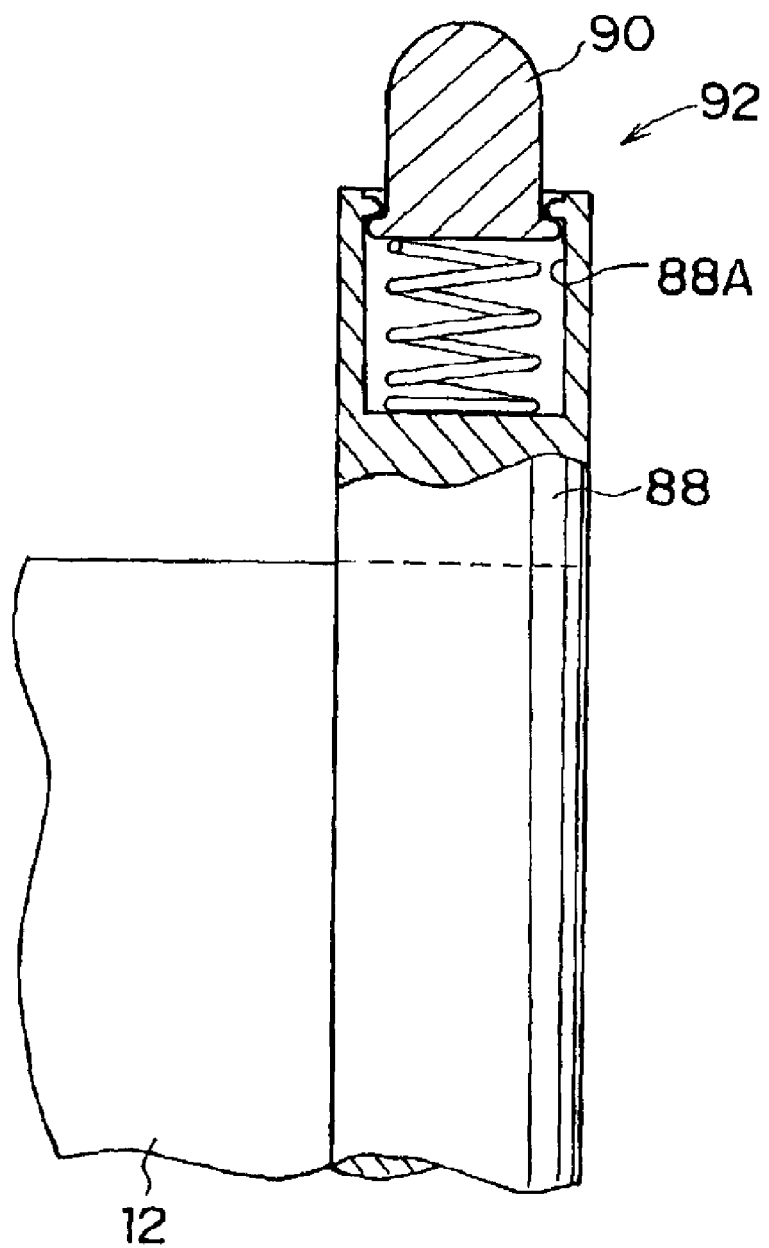
FIG. 8 is a partial cross-sectional view of another example of the leader pin of the recording tape cartridge of the present invention.

Although the leader pin having the receiving portion at the end thereof has been explained, the present invention is not to be unduly limited to such a form. Various modifications and alterations can be made, as long as the connecting portion is not affected by compression or release of the end portion of the leader pin. For example, as shown in FIG. 8, a recess 88A, within which the pin 90 is movable, can be formed directly at an end of a connecting portion 88.

Further, as shown in FIG. 2, the leader pin 18 may include a pair of flanges 38 and 40 to ensure precise attachment of the magnetic tape 12 to the leader pin 18. Both sides of the connecting portion 88, to which the magnetic tape 12 is fixed, can also serve as the connecting portion 88.

Although the leader pin is used as a leader member in this embodiment, any other leader member such as a leader block can also be used.

According to the present invention having the construction explained above, the load generated when the leader member is attached to or detached from the recording tape cartridge is absorbed by the resilient member, whereby the leader member can be readily attached to or detach from the cartridge, without having an excessive load applied thereto. It is possible to control the load generated when the leader member is attached to or detached from the recording tape cartridge, by providing the resilient member on the leader member to form a single body. Thus, control of the load is facilitated and irregularity of the set load is reduced. The resilient member is provided on the end surface of the connecting portion. The resilient member is resiliently projected in the axial direction of the leader member without covering the circumference of the connecting portion. As a result, compression and release of the resilient member do not change the length of the connecting portion in the axial direction of the leader member to which the drawing device of the drive system connects. Therefore, there will not be such a problem as the drawing device not being readily connected to the connecting portion due to compression of the resilient member.

What is claimed is:

1. A recording tape cartridge comprising:
   a case for containing a recording tape;
   a connecting portion provided on a leader member, the leader member being fixed to a leading end of the recording tape, and the connecting portion being connectable to a drawing device disposed in a drive system;
   a receiving portion provided at each of an upper portion and a lower portion of the leader member; and
   a resilient member accommodated in each of said receiving portions, and said resilient member resiliently projectable in an axial direction of the leader member without said receiving portion covering any portion of the connecting portion, and the resilient member fitting into a location determining portion formed on the case.

2. The recording tape cartridge according to claim 1, wherein the case comprises an upper case and a lower case, and the upper case and the lower case are fixed to each other to form a substantially rectangular box.

3. The recording tape cartridge according to claim 2, wherein the location determining portion is formed on each of the upper case and the lower case, each of the location determining portions comprise a groove for guiding the leader member, each of the grooves includes a slightly inclined floor, and a distance between the groove of the upper case and the groove of the lower case becomes greater approaching one wall of the upper and lower cases.

4. The recording tape cartridge according to claim 3, wherein a width of the grooves is substantially equal to an outer diameter of the receiving portion.

5. The recording tape cartridge according to claim 3, wherein at least one of the groove further comprises a location determining hole into which a leading end of the leader member is inserted, when the leader member moves along the grooves and reaches the location determining hole, the resilient member is slightly restored and the leading end of the leader member is inserted into the location determining hole to hold the leader member.

6. The recording tape cartridge according to claim 1, wherein the resilient member includes a spring.

7. The recording tape cartridge according to claim 6, wherein the leader member includes a leader pin substantially in a dumbbell shape, the dumbbell shaped leader pin includes upper and lower ends each with a relatively greater diameter than a center portion, the upper and lower ends each forming the receiving portions
   wherein each receiving portion having a substantially cylindrical shape, and each receiving portion includes a cylindrical recess at an axis of the receiving portion for accommodating the resilient member.

8. The recording tape cartridge according to claim 7, wherein the leader pin comprises a substantially cylindrical pin including a substantially semi-spherical leading end, the pin is capable of inserting into the recess, the pin includes a claw portion, the recess includes a projection along an inner circumference thereof, the claw portion is capable of engaging with the projection, and the pin is substantially fixed by inserting into the recess.

9. The recording tape cartridge according to claim 7, wherein the leader pin further comprises a pin corresponding to the spring, an end of the pin contacts an end of the spring, and the spring fits into the location determining portion via the pin.

10. The recording tape cartridge according to claim 7, wherein the leader pin comprises a pair of flanges corresponding to side ends of the recording tape.

11. The recording tape cartridge according to claim 1, wherein the drawing device includes a hook, and the hook is connectable to the connecting portion for drawing the leader member.

12. The recording tape cartridge according to claim 1, wherein the leader member includes a leader pin substantially in a dumbbell shape, the dumbbell shaped leader pin includes upper and lower ends each with a relatively greater diameter than a center portion, the upper and lower ends each forming the receiving portions,
   wherein each receiving portion having a substantially cylindrical shape, each receiving portion includes a cylindrical recess at an axis of the receiving portion for accommodating the resilient member.

13. The recording tape cartridge according to claim 12, wherein the leader pin comprises a substantially cylindrical pin including a substantially semi-spherical leading end, the pin is capable of inserting into the recess, the pin includes a claw portion, the recess includes a projection along an inner circumference thereof, the claw portion is capable of engaging with the projection, and the pin is substantially fixed by inserting into the recess.

14. The recording tape cartridge according to claim 12, wherein the location determining portion comprises a groove for guiding the leader member, the groove includes a slightly inclined floor, and the floor is formed deeper toward one wall of the case.

15. The recording tape cartridge according to claim 14, wherein a width of the groove is substantially the same as an outer diameter of the receiving portion.

16. The recording tape cartridge according to claim 14, wherein the groove further comprises a location determining hole into which a leading end of the leader member is inserted, when the leader member moves along the groove and reaches the location determining hole, the resilient member is slightly restored and the leading end of the leader member is inserted into the location determining hole to hold the leader member.

17. The recording tape cartridge according to claim 12, wherein the leader pin further comprises a pin corresponding to the resilient member, an end of the pin contacts an end of the resilient member, and the resilient member fits into the location determining portion via the pin.

18. The recording tape cartridge according to claim 12, wherein the leader pin comprises a pair of flanges corresponding to side ends of the recording tape.

19. The recording tape cartridge according to claim 1, wherein the location determining portion comprises a groove for guiding the leader member, the groove includes a slightly inclined floor, and the floor is formed deeper toward one wall of the case.

20. The recording tape cartridge according to claim 1, wherein the leader member includes a pin corresponding to the resilient member, an end of the pin contacts an end of the resilient member, and the resilient member fits into the location determining portion via the pin.

21. The recording tape cartridge according to claim 1, wherein said receiving portion has an opening at an upper end thereof, and a projection which is connected to an end of said resilient member, such that said projection projects through the opening at the upper end of the receiving portion.

22. A recording tape cartridge comprising:

a case for containing a recording tape;

a connecting portion provided on a leader member, the leader member bring fixed to a leading end of the recording tape, and the connecting portion being connectable to a drawing device disposed in a drive system;

a receiving portion provided at each of an upper portion and a lower portion of the leader member; and a resilient member accommodated in each of said receiving portions, an said resilient member resiliently deformable in an axial direction of the leader member, wherein neither the resilient members nor the receiving portions encroach upon any portion of the connecting portion during deformation of the resilient member.

23. The recording tape cartridge according to claim 22, wherein an axial length of the connecting portion remains substantially constant during deformation of the resilient member.

* * * * *